(12) United States Patent
Chu et al.

(10) Patent No.: US 7,074,318 B1
(45) Date of Patent: Jul. 11, 2006

(54) MOVABLE IONIC CONDUCTIVE WIRE AND METHOD OF FORMING AN ELECTROCHEMICAL CELL

(75) Inventors: Deryn D. Chu, Havertown, PA (US); Rongzhong Jiang, Olney, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 399 days.

(21) Appl. No.: 10/223,637

(22) Filed: Aug. 20, 2002

(51) Int. Cl.
*G01N 27/401* (2006.01)
*G01N 27/403* (2006.01)

(52) U.S. Cl. ...................... 205/775; 205/789
(58) Field of Classification Search ............... 204/435, 204/279, 243.1, 242, 232, 403.01–403.05, 204/416–418, 194, 424; 439/179; 429/12, 429/188
See application file for complete search history.

(56) References Cited

U.S. PATENT DOCUMENTS

| | | | |
|---|---|---|---|
| 3,668,101 A * | 6/1972 | Bergman | 204/415 |
| 3,742,594 A * | 7/1973 | Kleinberg | 29/592.1 |
| 5,120,421 A * | 6/1992 | Glass et al. | 204/406 |
| 5,834,195 A | 11/1998 | Benkovic et al. | |
| 5,880,972 A | 3/1999 | Horlbeck | |
| 5,951,846 A | 9/1999 | Lewis et al. | |
| 6,004,617 A | 12/1999 | Schultz et al. | |
| 6,132,971 A | 10/2000 | Thorp et al. | |
| 6,187,164 B1 | 2/2001 | Warren et al. | |
| 6,372,105 B1 * | 4/2002 | Saito et al. | 204/400 |

OTHER PUBLICATIONS

CAPLUS abstract of Gelfayan (Electrolytic reduction methods in analytical chemistry. VIII. Qualitative test for tungsten, Izvest. Akad. Nauk armyan. S.S.R., Fiz.-Mat., Estestven. i Tekh. Nauki (1950), 3, 523-6)(month unknown).*
Page 344 of Membrane Separation Systems—Recent Developments and Future Directions, Baker et al., Noyes Data Corporation, 1991 (munth not known).*
CAPLUS abstract of Ward ("Treatment of corks used in Soxhlet and other extraction apparatus," Analyst (1917), 42, 326-7) publn. month unknown.*
CAPLUS abstract of DE 1642205 A (Oct. 29, 1970).*
CAPLUS abstract of Terry ("Electrolytic estimation of arsenic," Midland Druggist and Pharmaceutical Review (1919), 53, 132-3).*

(Continued)

*Primary Examiner*—Alex Noguerola
(74) *Attorney, Agent, or Firm*—William V. Adams

(57) ABSTRACT

An ionic conductive wire and method of forming an electrochemical cell in which an electric insulate tube is filled with an ionic conductive material. Terminals proximate the ends of the electric insulate tube are sealed with a fine porous material that is electric-insulate. The ionic conductive wire is movable such that it selectively connects at least two electric conductive materials to form an electrochemical cell.

1 Claim, 4 Drawing Sheets

OTHER PUBLICATIONS

Reddington et al., "Combinatorial Electrochemistry: A Highly Parallel, Optical Screening Method for Discovery of Better Electrocatalysts," *Science* Jun. 12, 1998: 1735-1737.

Pollack et al., "Selective Chemical Catalysis by an Antibody," *Science* Dec. 19, 1986, Science, 234, 1570 (1986). (ABSTRACT).

Surampudi et al., "Advances in Direct Oxidation Methanol Fuel-Cells." *Journal of Power Sources* 47 3rd ser. (1994): 377-385.

Ren et al., "High Performance Direct Methanol Polymer Electrolyte Fuel Cells," *Electrochemical Society* 143 (1996).

Xiang et al., "A Combinatorial Approach to Materials Discovery." *Science* Jun. 23, 1995: 1738-1740.

Chu et al., "Methanol Electro-oxidation n Unsupported Pt-Ru Alloys at Different Temperatures." *J. Electrochem. Soc.* 143 (1996): 1685-1690.

* cited by examiner

MOVABLE IONIC CONDUCTIVE WIRE AND METHOD OF FORMING AN ELECTROCHEMICAL CELL

STATEMENT OF GOVERNMENT INTEREST

The invention described herein may be manufactured, used and/or licensed by or for the Government of the United States of America.

BACKGROUND OF THE INVENTION

1. Field of the Invention

The present invention relates in general to ionic conductive wires and methods and more particularly, to ionic conductive wires and methods for use in screening electrode samples in an array of combinatorial electrodes.

2. Description of the Related Art

Generally, an electrochemical cell is composed of electrodes and electrolyte. An electrochemical reaction is a chemical reaction that occurs between the electrode and electrolyte. Electrochemistry is a branch of science that studies chemical reactions within an electrochemical cell. Many electrochemical devices have been widely used in fuel cells, batteries, capacitors, sensors and electrochromic displays. Normally, only one electrochemical cell is used in traditional electrochemical research.

Recently, a combinatorial approach to study the electrochemistry, where an array of electrodes was studied, i.e., a group of electrochemical cells. The combinatorial concept originated from biology to screen large collections of samples, or a library of biological structures. One of the applications to molecular chemistry was the development of catalytic antibodies. More recently it has been introduced to material science for use in superconductors. Successful catalysts from hundreds of binary, ternary and quaternary metal alloy compositions using the combinatorial approach have been, found. However, an optical screening method has been used to determine the variations of proton concentration within various small active portions. Because the variation of proton concentration is not detectable within these small portions in concentrated base and acid solutions, the wide applications of the optical screening method has been limited in many practical electrochemical systems.

An electrolyte is a phase through which charge is carried by the movement of ions. Electrolytes may be liquid solutions or fused salts, or they may be ionic conductive solids, such as polymer electrolytes. Numerous electrolyte compositions have been reported, including liquid and polymer electrolytes. However, these electrolytes have not been designed for combinatorial electrochemistry.

Additionally, various electrochemical cells and apparatus have been employed for a variety of applications in fuel cells, batteries, capacitors, sensors, electrochromic displays and laboratory experiments. The combinatorial method has been utilized in recent years to screen hundreds or thousands of experimental samples in a short time. Use of the combinatorial method has been employed in chemical synthesis, microelectronic devices, sensors, and identification of chemicals.

In recent years, the direct methanol fuel cell (DMFC) has been a very active area in fuel cell research. One of the serious technical obstacles for development of DMFC is poor catalytic activity of the anode catalysts. Approximately one-third of the available energy is lost at the anode electrode due to poor activity of the catalyst. In order for the DMFC to become a practical power, the anode catalyst must be improved. A single face ternary Pt—Ru—Os catalyst for direct methanol fuel cells has been seen. (65% Pt, 25% Ru and 10% Os). Many experimental measurements are needed for study on numerous catalyst samples. The traditional approach is to measure the current and voltage of experimental fuel cells one by one under numerous experimental conditions. It is very difficult to completely evaluate all of the catalysts at the same time and under the same experimental conditions. The variations of time and experimental conditions cause the research on electrode catalysts to be more complex.

BRIEF SUMMARY OF THE INVENTION

The present invention provides a movable ionic conductive wire to connect electrodes that are located at a distance from one another in order to form an electrochemical cell particularly for use in screening an array of electrodes for combinatorial electrochemistry.

The present invention also provides a method of forming an electrochemical cell using a movable ionic conductive wire to connect electrodes that are located at a distance from one another.

It is an object of the invention to provide a device to improve and speed up electrochemical research in fuel cells, batteries, capacitors, sensors and electrochemical displays.

The foregoing and other objects and advantages of the present invention will hereafter become more fully apparent from the following detailed description. In the description, reference is made to examples, a table and drawings which form a part thereof, and which are shown by way of illustration and not limitation as a preferred embodiment of the invention. Such description does not represent the full extent of the invention, but rather, the invention may be employed according to the full scope and spirit of the invention as defined in the claims.

DETAILED DESCRIPTION

Figure 1A:
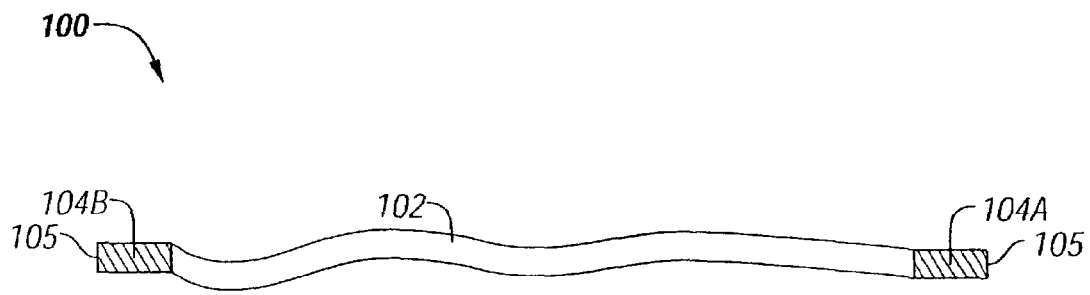
FIG. 1A is a schematic representation of a movable ionic conductive wire.
Figure 1B:
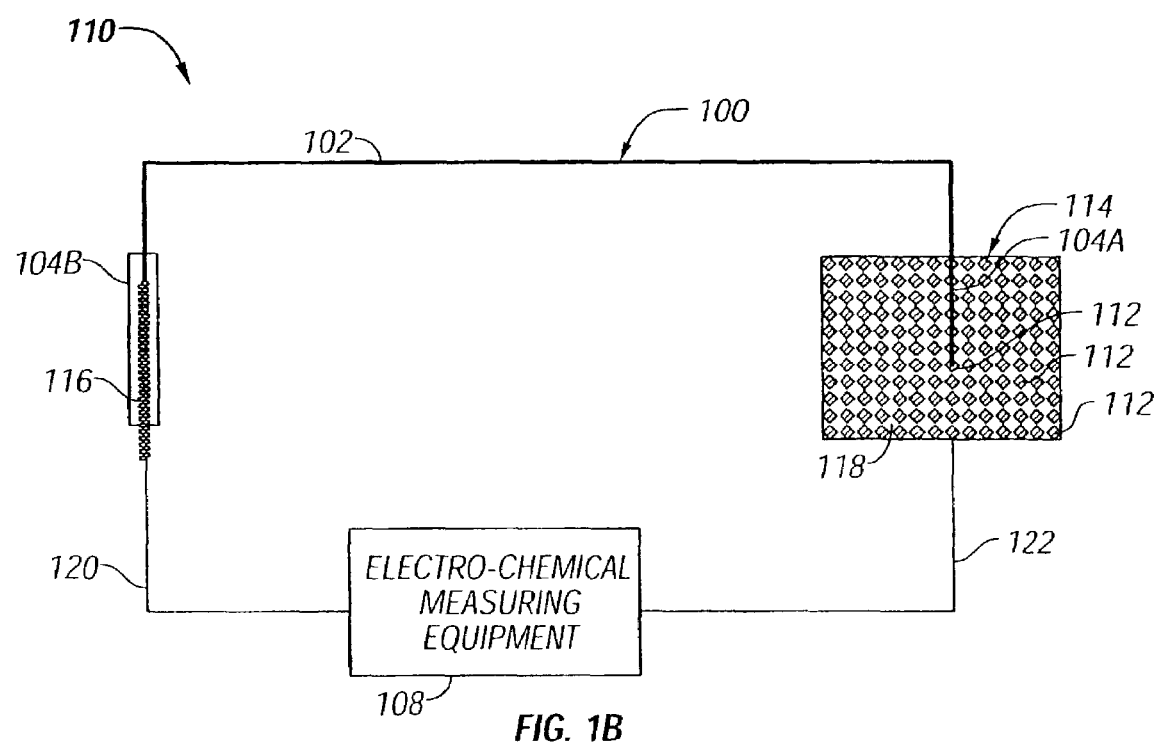
FIG. 1B is a schematic representation of a movable ionic conductive wire coupled between a reference electrode and an array of working electrodes.

Referring to FIGS. 1A and 1B, ionic conductive wire 100 is conducted by moving of ions, which is different from devices having an electric lead where the conductivity is obtained by the moving of electrons. The ionic conductive wire 100 has an electric-insulate tube 102 that is filled with ionic conductive material, such as in some examples electrolyte solutions, polymer electrolyte or molten salts. The two terminals 104A, 104B proximate the ends 105 of the movable ionic conductive wire 100 are selectively sealed by fine porous ceramic or fine porous polymer membrane or ionic exchange membrane. The ionic conductive wire 100 is readily movable such that it may selectively connect at least two electric conductive materials to form an electrochemical cell.

The ionic conductive wire 100 is used in one example to form an electrochemical cell by connection of two surfaces on the electric conductive materials that can be metals, graphite or semiconductors. The anode and the cathode of the cell utilizing the movable ionic conductive wire 100 are placed at a certain distance that is different from known electrochemical cells. In one example, the length of the electric insulate tube is at least eleven (11) centimeters in length and generally the electric insulate tube is at least fifty (50) centimeters in length.

The electrochemical cell such as seen in FIG. 1B, may be used to measure the impedance, current and potential responses with general electrochemical equipment 108, such as potentiostat, galvenostat, battery tester, AC impedance and potential meter etc. FIG. 1B shows a method to form electrochemical cells 110 using the ionic conductive wire 100, and the connections between the electrochemical cell and the electrochemical equipment 108. As seen in FIG. 1B, one terminal 104A of the ionic conductive wire 100 is coupled with an electrode 112 of an array 114 of working electrodes 112 and the other terminals 104B is coupled with the reference electrode 116. The array 114 of working electrodes 112 are formed on an electric conductive plane 118 for combinatorial measurements. The electrochemical measuring equipment 108 (for example a potential meter or battery tester) is coupled to reference electrode (or counter electrode) 116 by electric lead 120 and is coupled with the electrode array 114 by electric lead 122. The ionic conductive wire 100 is able to screen the array of working electrodes 112 by switching the one terminal 104A form one working electrode to other working electrodes of the array 114.

Figure 2:
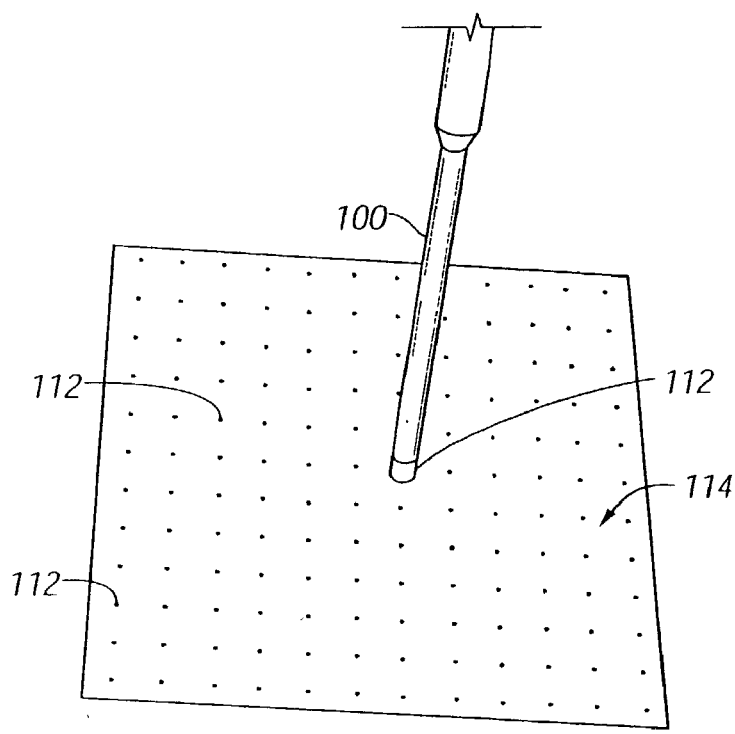
FIG. 2 illustrates an electrode array having working electrodes, one of which is connected with a movable ionic conductive wire.

The ionic conductive wire is movable such that can be used for screening electrode array 114 for combinatorial electrochemistry. FIG. 2 illustrates an experimental device of an electrode array 114 with one hundred forty four (144) working electrodes 112. One of the electrodes 112 in the array 114 is connected with the ionic conductive wire 100. In this example, an electrode area of approximately 0.03 cm$^2$ was used with the distance between electrodes being approximately 1.0 cm. The electrode material employed was graphite plate and a Teflon-cover may be used as an ionic insulate between electrodes.

Figure 3:
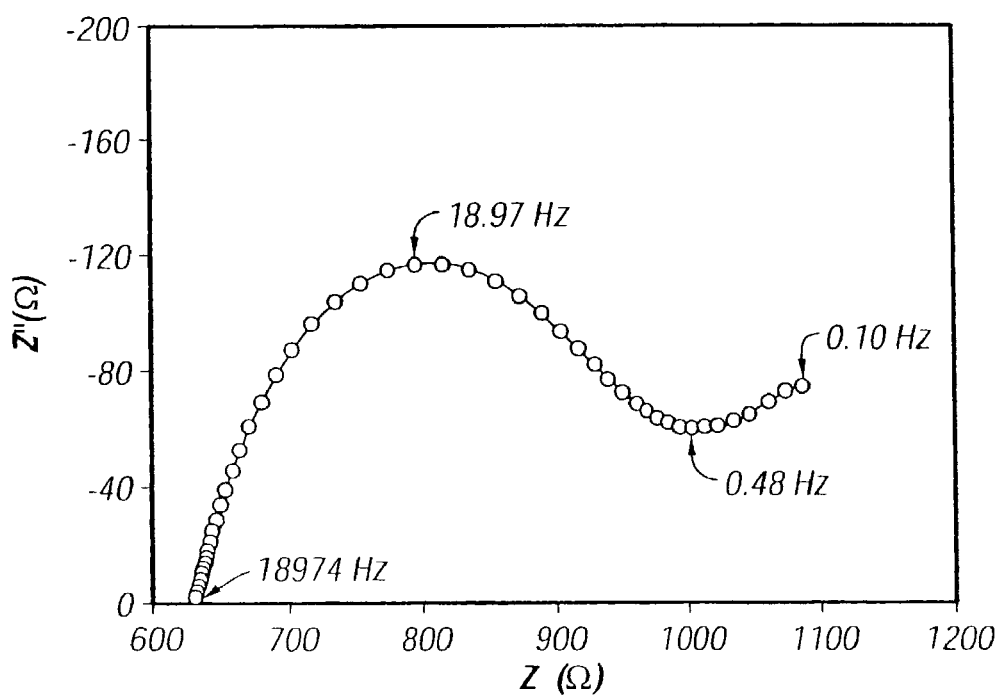
FIG. 3 shows an AC impedance result of a Cu—$H_2SO_4$—Cu cell using the ionic conductive wire for electrolyte.

The impedance response is able to be obtained using the ionic conductive wire to connect two electrodes. FIG. 3 shows an AC impedance result of a Cu—H$_2$SO$_4$—Cu cell. The cell was formed by connecting two copper foil surfaces with the ionic conductive wire 100. A standard AC impedance semicircle is shown between the high and middle frequencies. This way of measuring impedance is useful in analysis of the surfaces of materials and in the research of metal corrosions.

The potential response can be obtained using the electrochemical cell employing the ionic conductive wire. Table 1 shows potential responses at some metal surfaces in air by combinatorial measurements with the movable ionic conductive wire.

Table 1

Potential responses obtained by a movable ionic conductive wire for conductive solid materials.

| Metals | Potential Responses (V vs. RHE) |
|--------|-------------------------------|
| Mn | −0.022 |
| Al | +0.011 |
| W | +0.395 |
| Cu | +0.397 |
| Ag | +0.530 |
| Mo | +0.542 |
| Graphite | +0.641 |
| Rh | +0.809 |
| Pd | +0.895 |
| Pt | +1.049 |

In these examples the ionic conductive wire joined two electrodes, which were located in two places with certain distance, to obtain an electrochemical cell. A large number of working electrodes were arrayed on a graphite plane to form an electrode array. Each of the electrodes in the electrode array was coated with different metal powders. A commercial 5% Nafion® Perfluorinated Ion-exchange Resin (from Aldrich Chemical Company) was used as electrode binder for holding the catalyst powders on the electrodes. 10% Nafion® Perfluorinated Ion-exchange Resin and 85% metal powders were used in all experiments. The movable ionic conductive wire was filled with 3 M H$_2$SO$_4$. All the measurements were completed under an air atmosphere. The reference electrode was reversible hydrogen electrode (RHE). The response time is fast, only a few seconds needed for obtaining a stable potential data. The potential responses on the surface of solid materials are useful for identification and analysis of solid, liquid and gaseous materials. The potential responses are also able to be used for the development of sensors.

Figure 4:
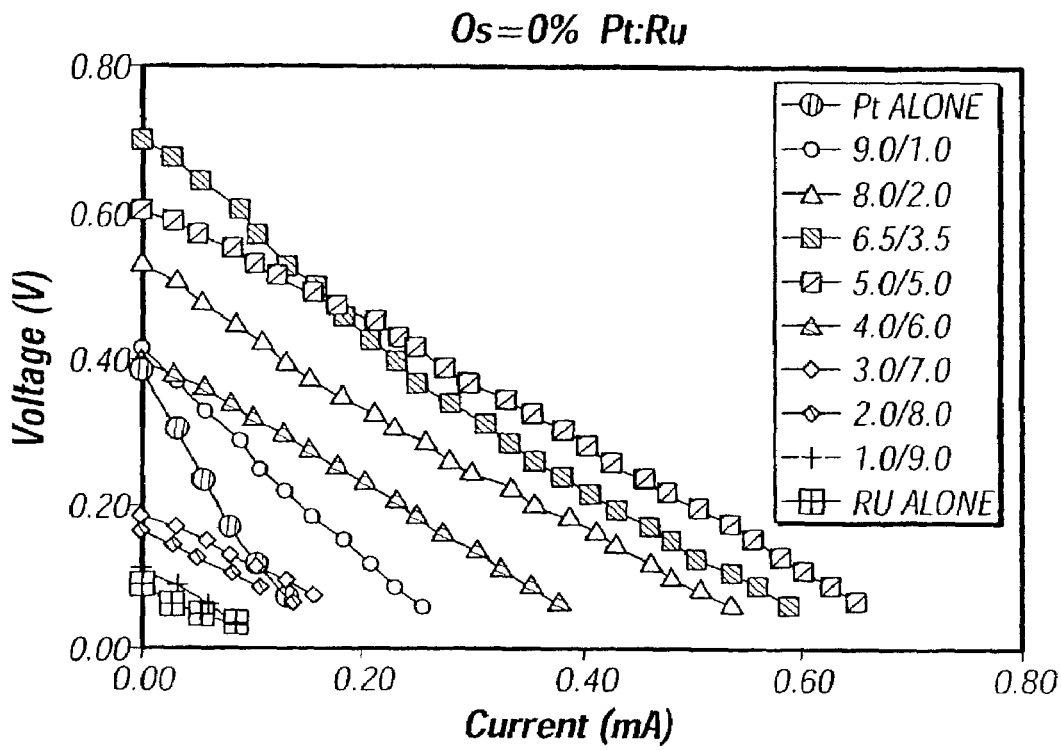
FIG. 4 is a graph illustrating an example of current response and discharge performance of combinatorial electrochemical cells.
Figure 5:
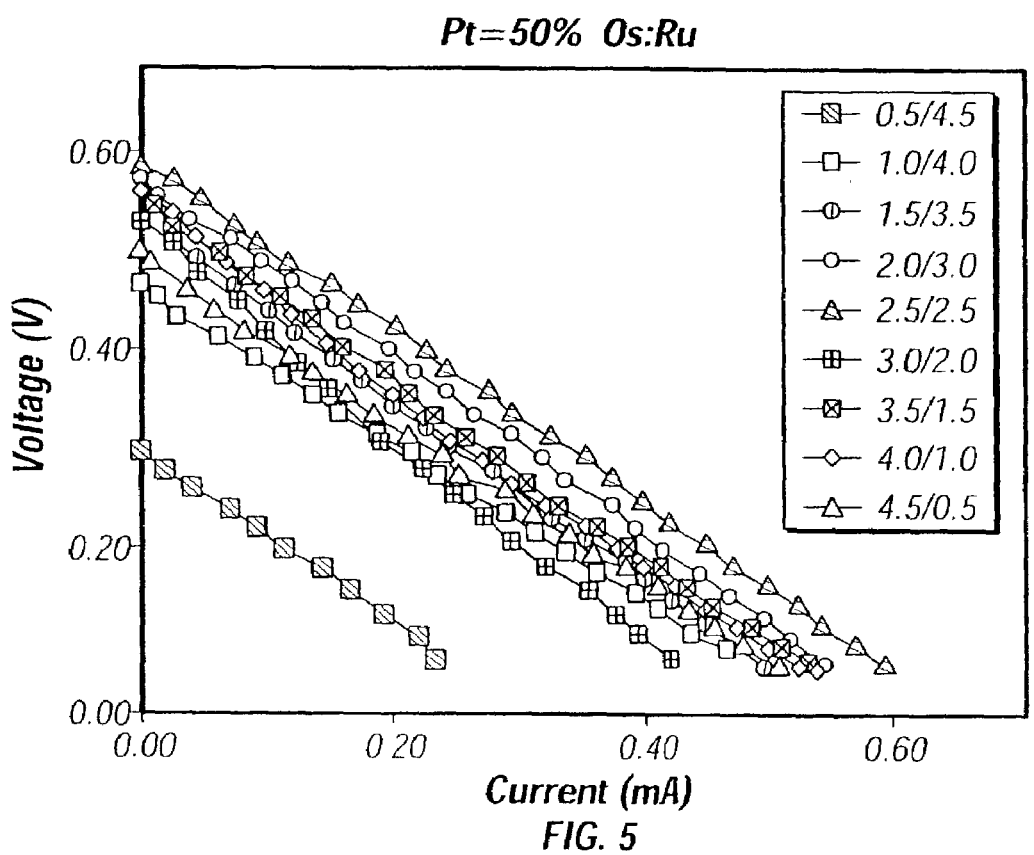
FIG. 5 is a graph illustrating another example of current response and discharge performance of combinatorial electrochemical cells.
Figure 6:
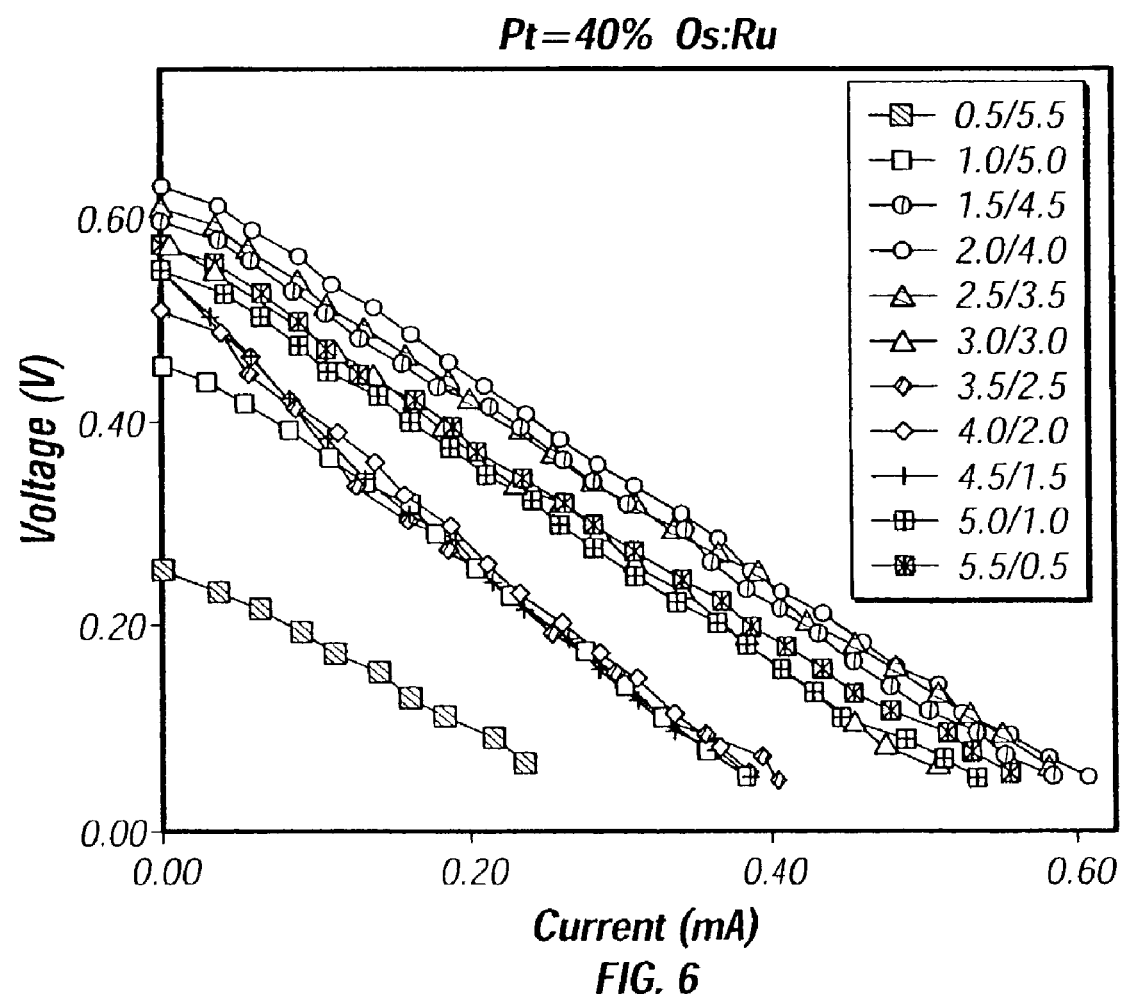
FIG. 6 is a graph illustrating another example of current response and discharge performance of combinatorial electrochemical cells.

The current response can also be obtained using the electrochemical cell employing the ionic conductive wire. FIG. 4, FIG. 5 and FIG. 6 show the current responses from combinatorial measurements using the ionic conductive wire for screening arrays of electrodes. Various discharge voltage-current curves are obtained.

In FIG. 4 different compositions of binary catalysts are measured, which are coated on the combinatorial electrodes that form methanol fuel cells with a shared counter electrode and the movable ionic conductive wire. An advantageous binary catalyst for methanol oxidation is obtained when the Ru and Pt atomic ratio is 1 to 1, because it has the highest discharge current. The discharge performance of combinatorial fuel cells seen in FIG. 4 had Pt black as catalyst for cathode under air atmosphere and Pt/Ru as catalyst for anode (0.03 cm$^2$) that was filled with 3M methanol. The ionic conductive wire was filled with 3M H$_2$SO$_4$ at 20° C. temperature.

In FIG. 5 different compositions of ternary catalysts are measured, which are coated on the combinatorial electrodes that form methanol fuel cells with a shared counter electrode and the movable ionic conductive wire. Here, the Pt content is kept constant at 50%. The discharge performance of combinatorial fuel cells seen in FIG. 5 had Pt black as catalyst for cathode under air atmosphere and Pt/Os/Ru as catalyst for anode (0.03 cm$^2$) that was filled with 3M methanol. The ionic conductive wire was filled with 3M H$_2$SO$_4$ at 15° C. temperature.

In FIG. 6 different compositions of ternary catalysts are measured, which are coated on the combinatorial electrodes that form methanol fuel cells with a shared counter electrode and the movable ionic conductive wire. Here, the Pt content is kept constant at 40%. A ternary catalyst for methanol oxidation is obtained when the atomic ratio is 40% Pt. 20% Os and 40% Ru. The discharge performance of combinatorial fuel cells seen in FIG. 6 had Pt black as catalyst for cathode under air atmosphere and Pt/Os/Ru as catalyst for anode (0.03 cm$^2$) that was filled with 3M methanol. The ionic conductive wire filled with 3M $H_2SO_4$ at 15° C. temperature.

Examples will now be described in detail below which serve to illustrate the preparation and testing of illustrative embodiments. However, it will be understood that the present invention is in no way limited to the examples set forth below.

General Procedure

Chemicals and Materials: The pure element metal fine powders of Mn, Al, W, Cu, Ag, Rh, Pd, Pt and purity copper foil were obtained. The purity graphite plates were obtained from SGL Crabon Corp., and used for processing arrays of anode electrodes for methanol fuel cells. Transition metal salts of $H_2PtCl_6$, $OsCl_3$, $RuCl_3$ were obtained from Alfa Aesar Chemical Co.

Synthesis of Catalysts: The binary and ternary metal alloys were synthesized with transition metal salts, such as $H_2PtCl_6$, $OsCl_3$, $RuCl_3$. The solution containing mixtures of metal salts was adjusted to pH to 9–10, then the reducing agent solution (1 M $NaBH_4$) was added by dropping until about 10 times excess. The precipitates of these alloys were collected and washed 5 times. In order to obtain fine catalyst powder, each of the wet precipitates was treated with ultrasonication for 5 minutes in the presence of appropriate amount of water. After ultrasonication the alloy samples were dried at 120° C.

Combinatorial Electrodes: The combinatorial electrodes were prepared with a flat graphite plate. Each electrode had exposed area 0.03 cm$^2$ and placed in distance at 1.0 cm from each other. These electrodes were electrically short but ionically insulate. Because these electrodes were isolated by a Teflon cover, the liquid electrolyte on each electrode were not able to contact each other.

EXAMPLE 1

An electrochemical cell was formed using the ionic conductive wire to connect the two surfaces of copper foils, here both electrodes were copper. The ionic conductive wire is 86 cm in length and filled with 3 M $H_2SO_4$. The AC impedance was measured with the Solartron SI 1287 Electrochemical Interface and SI 1260 Impedance/Gain-phase Analyzer. In FIG. 3, a standard AC impedance semicircle is shown between the high and middle frequencies. The real impedance of the ionic wire was obtained as 633 Ω at 18974 Hz. A relatively straight line appears at frequencies lower than 0.48 Hz, due to the electrochemical reaction at the $Cu/H_2SO_4$ interface.

EXAMPLE 2

The elemental metal powders were coated on the combinatorial electrodes with 10% Nafion® Perfluorinated Ion-exchange Resin. The ionic conductive wire was prepared with a plastic tube filled with 3 M $H_2SO_4$ as electrolyte. One end of the ionic conductive wire connected with a reference electrode (Reversible hydrogen electrode, RHE), the other was sealed with fine porous ceramic rods and used for screening electrodes that were coated with metal powders. A metal powder coated electrode and the reference electrode formed an electrochemical cell with the ionic conductive wire. The combinatorial measurement was obtained by switching one end of the ionic conductive wire from one electrode to another. The potential responses of these metal-powder-coated-electrode-surfaces were measured with a FLUKE 8840A multimeter. Table 1 shows the potential responses of these metal powder coated electrode surfaces. The response time was fast, only a few seconds for each stable potential data record. All these experiments were conducted under air atmosphere. The Pt coated electrode surface had the highest potential response (+1.049 V) and the Mn (−0.022 V) or Al (+0.011 V) surface had the lowest potential response.

EXAMPLE 3

Binary catalyst (Pt/Ru) for methanol fuel cells: The ionic conductive wire was prepared with a plastic tube filled with 3 M $H_2SO_4$ as electrolyte, whose two terminals were two fine porous ceramic rods for sealing. The cathode was a large area electrode coated with platinum black for catalytic oxygen reduction. A large number of anode electrodes were generated on a graphite plane. Each anode electrode was coated with metal alloys containing 10% Nafion® Perfluorinated Ion-exchange Resin for catalysis of methanol oxidation. The ionic conductive wire connected the cathode and the anode to form a separate methanol fuel cell, and then was switched from one anode to another for screening different anode electrodes and form different methanol fuel cells. The current responses, i.e., discharge voltage-current curves of these fuel cells were recorded with an Arebin Battery Test Station. FIG. 4 shows the discharge performance of these combinatorial fuel cells. When the atomic ratio of Pt/Ru is 1:1, the binary catalyst shows the highest catalytic activity for methanol oxidation.

EXAMPLE 4

Ternary catalyst (Pt/Os/Ru) for methanol fuel cells (50% Pt): The ionic conductive wire was prepared with a plastic tube filled with 3 M $H_2SO_4$ as electrolyte, whose two terminals were two fine porous ceramic rods for sealing. The cathode was a large area electrode coated with platinum black for catalytic oxygen reduction. A large number of anode electrodes were generated on a graphite plane. Each anode electrode was coated with metal alloys containing 10% Nafion® Perfluorinated Ion-exchange Resin for catalysis of methanol oxidation. The ionic conductive wire connected the cathode and the anode to form a separate methanol fuel cell, and then was switched from one anode to another for screening different anode electrodes and form different methanol fuel cells. The current responses, i.e., discharge voltage-current curves of these fuel cells were recorded with an Arebin Battery Test Station. The content of the Pt was kept constant at 50%, and varying the atomic ratio of Ru and Os. FIG. 5 shows the discharge performance of these combinatorial fuel cells. When the atomic ratio of Os/Ru is 25%:25%, the ternary catalyst shows the highest catalytic activity for methanol oxidation in this system.

EXAMPLE 5

Ternary catalyst (Pt/Os/Ru) for methanol fuel cells (40% Pt): The ionic conductive wire was prepared with a plastic tube filled with 3 M $H_2SO_4$ as electrolyte, whose two terminals were two fine porous ceramic rods for sealing. The cathode was a large area electrode coated with platinum black for catalytic oxygen reduction. A large number of anode electrodes were generated on a graphite plane. Each anode electrode was coated with metal alloys containing 10% Nafion® Perfluorinated Ion-exchange Resin for catalysis of methanol oxidation. The ionic conductive wire connected the cathode and the anode to form a separate methanol fuel cell, and then was switched from one anode to another for screening different anode electrodes and form different methanol fuel cells. The current responses, i.e., discharge voltage-current curves of these fuel cells were recorded with an Arebin Battery Test Station. The content of the Pt was kept constant at 40%, and varying the atomic ratio of Ru and Os. FIG. 6 shows the discharge performance of these combinatorial fuel cells. When the atomic ratio of Os/Ru is 20%:40%, the ternary catalyst shows the highest catalytic activity for methanol oxidation in this system. By combining the results of FIG. 5 and FIG. 6, it is seen that when the atomic ratio is 40% Pt:20% Os and 40% Ru, the ternary catalyst shows the highest catalytic activity for methanol oxidation.

After reading the foregoing specification, one of ordinary skill will be able to effect various changes, substitutions of equivalents and various other aspects of the present invention as broadly disclosed herein. It is therefore intended that the protection granted hereon be limited only by the definition contained in the appended claims and equivalents thereof.

Having thus shown and described what is at present considered to be the preferred embodiment of the present invention, it should be noted that the same has been made by way of illustration and not limitation. Accordingly, all modifications, alterations and changes coming within the spirit and scope of the present invention are herein meant to be included.

What is claimed is:

1. A method of forming an electrochemical cell comprising the steps of:

filling an electric insulate tube of an ionic conductive wire with 3M $H_2SO_4$ at 15–20° C. temperature;

scaling terminals proximate the ends of the electric insulate tube with fine porous electric insulate material selected from at least one of (a) porous ceramic, (b) porous polymer membrane, and (c) ionic exchange membrane;

selectively moving the ionic conductive wire such that it connects at least two electric conductive materials;

coupling one terminal of the ionic conductive wire with, as a first conductive material, an electrode of an array of a plurality of working electrodes formed on an electric conductive plane for combinatorial measurement;

coupling a second terminal of the ionic conductive wire, as a second conductive material, with a reference electrode; and screening the array of working electrodes by switching the one terminal from one working electrode to other working electrodes of the array.

* * * * *